Nov. 25, 1947.  E. M. LAUER  2,431,490
PILL DISPENSER
Original Filed Feb. 19, 1941
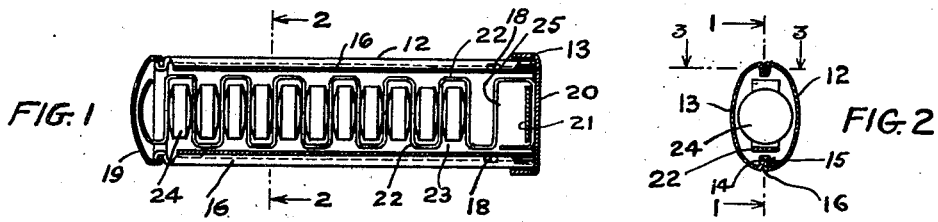
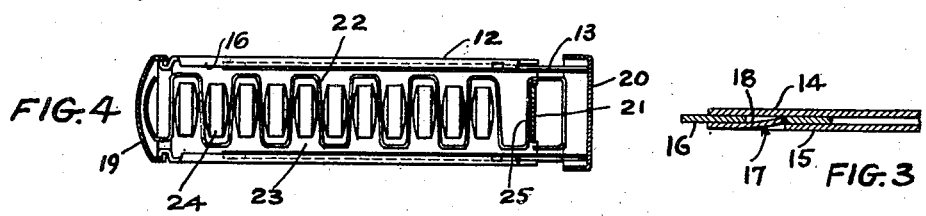
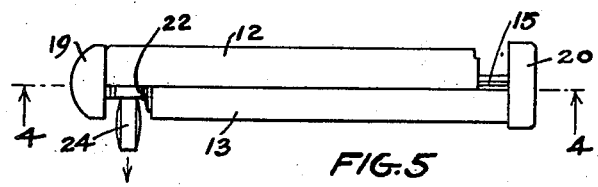
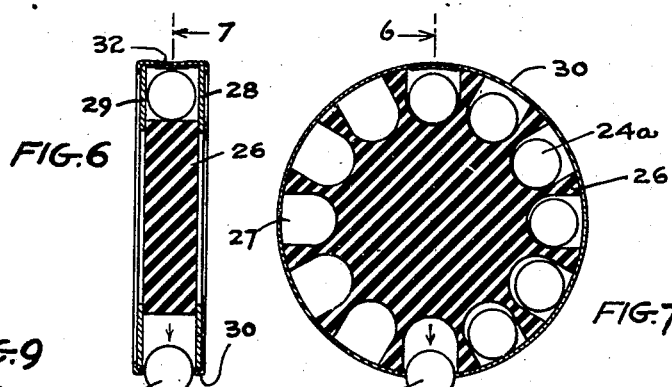
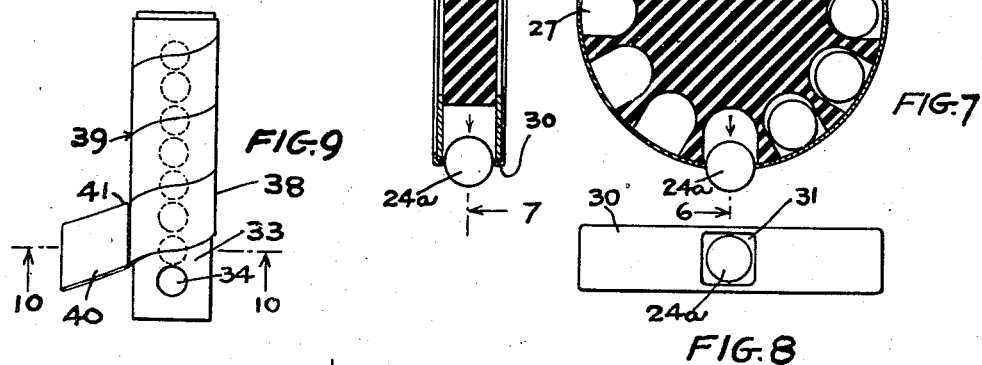
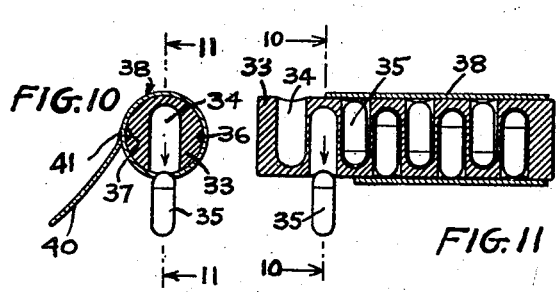
INVENTOR
ELMA M. LAUER
BY
ATTORNEYS.

Patented Nov. 25, 1947

2,431,490

UNITED STATES PATENT OFFICE 2,431,490

PILL DISPENSER

Elma M. Lauer, Hollywood, Calif.

Original application February 19, 1941, Serial No. 379,604. Divided and this application April 12, 1944, Serial No. 530,608

3 Claims. (Cl. 206—42)

This application is a division of application Serial Number 379,604, filed February 19, 1941, which has matured into Patent Number 2,362,835, dated November 14, 1944, and the invention relates to a dispenser for storing and dispensing pills, tablets, capsules and the like, one at a time, and has for its object the provision of a dispenser which is simple and cheap to manufacture, that can be readily carried in the pocket or in a lady's pocketbook.

Another object is to provide a dispenser of the class described in which the contents is prevented from shaking about in the dispenser when same is only partially filled.

Another object is to provide a dispenser in which each pill, tablet or capsule is received into and discharged from an individual chamber.

A further object is to provide a dispenser of the class described that can be used as a merchandising package, instead of the usual box or bottle.

Further objects and advantages will appear from the following specification, whereby by way of illustration are shown three embodiments of the device. It will be understood, however, that these embodiments are merely illustrative of the invention and that the details of construction herein shown can be varied within wide limits without departing from the scope of the appended claims.

In the accompanying drawings:

Figure 1 is a vertical sectional view on the line 1—1 of Figure 2;

Figure 2 is a transverse sectional view on the line 2—2 of Figure 1;

Figure 3 is a detail sectional view of the casings on the line 3—3 of Figure 2;

Figure 4 is a view similar to Figure 1, except with the casing partly opened;

Figure 5 is a side elevational view of the device shown in the preceding figures;

Figure 6 is a sectional view on the line 6—6 of Figure 7, showing another form of construction;

Figure 7 is a sectional view on the line 7—7 of Figure 6;

Figure 8 is a bottom view of the device shown in Figure 7;

Figure 9 is a vertical plan view of another form of device;

Figure 10 is a sectional view of the device, Figure 9, on the line 10—10; and

Figure 11 is a sectional view on the line 11—11 of Figure 10.

Referring to Figure 1, the numerals 12 and 13 denote cooperating elongated members forming a casing. These members are freely slidable upon each other and may be held in cooperative relationship in any suitable manner such as that shown in Figure 2 wherein the member 13 has its longitudinal edges 14, 15 turned over as shown to form a U-shaped channel or groove adapted to receive the inturned edges 16 of member 12, which is therefore freely slidable longitudinally therealong.

To prevent the member 13 from being completely withdrawn from 12—the longitudinal edge 15 of member 13 is notched to provide a tongue 17 which is sprung inwardly to engage a notch 18 cut at the proper place in the inturned edge 16 of member 12. As 13 is withdrawn from 12—that is, moved to the right, Fig. 1—the tongue 17 will ride along within the groove formed by the edges 14, 15, until it encounters the notch 18, whereupon the tongue will spring inwardly to the position shown in Figure 3, preventing further withdrawal of the member 13.

The member 12 has a cap 19 secured thereto in any suitable manner, this cap being oval to abut the adjacent end of the member 13.

The member 13 has a cap 20 secured thereto in any suitable manner, this cap also being oval to extend over the adjacent end of the member 12.

Extending transversely of the device and preferably formed integral with the member 12 is a tongue 21 adapted to lie across the path of travel of a spring separator 22 to retain said spring in the device and to act in a manner to be presently described.

The spring 22 merely lies within the casing and is not secured thereto. It is of rectangular cross-section as shown in Figure 2, and is formed as shown in Figures 1 and 4 to provide the spaces 23, adapted to receive pills, tablets, capsules, or other small articles to be dispensed.

When the device is in closed position, as shown in Figure 1, the spring is so formed that it will be lightly compressed so as to hold the contents of the spaces 23—for example, the aspirin tablets shown in Figures 1 and 4—so they will not shake about.

When the device is opened by pulling lightly upon the heads or caps 19, 20, the spring 22 can expand until the part thereof designated by the numeral 25 comes in contact with the tongue 21. This relieves the tablets 24 from pressure and, as the members 12, 13, forming the casing are withdrawn from each other, the tablets 24 may drop out of the device, as shown in Figure 5.

To load the device when it is empty, the casings being withdrawn from each other to the extent permitted by the tongue 17, a fresh supply of tablets are dropped in the spaces 23, and the members 12, 13, are pushed together to close the device in a manner that will be obvious. Enough frictional resistance is provided by the U-shaped channel and the cooperating edges 14, 15, 16, of the members 12, 13, together with the tongue 17, to hold them in closed position against the slight tension of spring 22, or in any other position in which they may be placed.

Referring to Figures 6 to 8, inclusive, which show another form of the device, the numeral 26 denotes a body member having a plurality of notches 27 adapted to receive pills 24ª. Overlying the open sides of these notches are the annular members 28, 29, the inner annular edges of which extend inwardly as shown slightly below the bottom of the notches.

The members 28 and 29 are clamped by the outer ring 30 of thin metal or other suitable material against the body 26. The ring 30 is so applied to the body 26 that it, together with the annular members 28 and 29 may be moved about the circumference of the body in frictional engagement therewith.

The ring 30 has a suitable aperture 31 therein large enough to permit the passage of one of the pills 24ª therethrough; and, by holding the body 26 and turning the ring 30, the aperture 31 may be brought opposite any one of the notches 27, and the pills 24ª therein will drop out, as shown in Figures 6 and 7. A depression 32 is formed in the ring 30 opposite the aperture 31.

To load the device of Figure 6, it is only necessary to drop the pills 24ª into the empty notches 27 as the ring 30 is turned to permit this to be done.

By stopping the depression 32 in one of the notches 27, as shown in Figure 7, the ring is held against accidental rotation.

The modification shown in Figures 9 to 11, inclusive, shows a form of the device that may be used as a container and thrown away after the contents are used. Of course, it can be retained and reloaded if desired.

Referring to Figure 9, the body 33 may be made of wood or other cheap material and is provided with a plurality of pockets as shown at 34, each adapted to receive a pill, tablet, capsule 35, or the like. Oppositely spaced grooves 36, 37, extend longitudinally of the body, which after being loaded, has wrapped about it the outer cover 38 of paper, Cellophane or the like, which is coated on the inside with a suitable adhesive which permits it to be spirally stripped off the body along the line 39. If the cover is applied as a strip, it is wound spirally about the body; if it is applied in one piece, it may be perforated along the line 39.

The body 33 being loaded with capsules, for example, and the cover 38 being applied thereto, starting at one end of the body the cover is stripped off to expose one capsule, the pockets being arranged to permit this to be accomplished. A single capsule being exposed, the cover pulled off, as shown at 40, is cut off by pressing the thumb-nail along same at 41 where it overlies one of the grooves 36—37. Thus, the remaining capsules are held in place by the remainder of the cover in place on the body.

The manner of reloading the device is obvious.

Obviously, the spaces 23, notches 27 and pockets 34 may be of any suitable size and conformation to take any desired object such as a pill, tablet, capsule, piece of candy or the like; such modifications are obvious. Also, the cover 38 of the device, Figures 9 and 11, inclusive, can be a plain cardboard or metal tube, slidable over the body 33, to permit, as it is withdrawn, the removal of a single capsule.

It will be observed that any of the embodiments of the invention shown permit of the individual storage of the pills, tablets, or the like, as well as the individual removal thereof, and that each pill is held in its separate container or space, which prevents the pills from being damaged by rubbing against each other as often happens when they are contained in a partially filled box or bottle.

Also, by placing a number or other marking opposite each pocket, such as the spaces 23 or notches 27, the number of pills taken from and remaining in the device can be instantly ascertained.

It will be understood that the words "pills," "tablets," and "capsules" are used interchangeably herein and that all or any one of them also denotes any other small article such as chewing gum pellets, candy or any other small articles it is desired to dispense, one at a time, from a device of this character that is small and can be easily carried in the pocket or a handbag.

What is claimed is:

1. A dispenser comprising a two-part longitudinally split casing said parts being in longitudinal sliding engagement, a longitudinally expansible separator mounted therein and forming separate pill-receiving spaces, means for applying pressure to said separator longitudinally thereof when said casing is in closed position whereby said spaces will be longitudinally contracted, and means to prevent the total separation of the parts of said casing.

2. The dispenser as claimed in claim 1, wherein each of the parts of the casing is provided with a cap having a portion overlying and serving to close the end of the casing.

3. A dispenser comprising a two-part outer casing, said parts being in longitudinal sliding engagement, means within said casing for limiting the separation of the parts of said casing, and a spring member within said casing forming therein a plurality of individual pill retaining pockets adapted to individually discharge their contents through thte space formed by the separation of the parts of said casing.

ELMA M. LAUER.

REFERENCES CITED

The following references are of record in the file of this patent:

UNITED STATES PATENTS

| Number | Name | Date |
|---|---|---|
| 437,837 | Promis | Oct. 7, 1890 |
| 615,611 | Dunford et al. | Dec. 6, 1898 |
| 1,594,759 | Schweinert | Aug. 3, 1926 |
| 1,680,130 | Connor | Aug. 7, 1928 |
| 2,046,869 | Burke | July 7, 1936 |
| 2,057,180 | Berg | Oct. 13, 1936 |
| 2,105,424 | Kahn | Jan. 11, 1938 |
| 2,138,241 | Koch et al. | Nov. 29, 1938 |
| 2,324,228 | Nash | July 13, 1943 |

FOREIGN PATENTS

| Number | Country | Date |
|---|---|---|
| 375,694 | Great Britain | June 30, 1932 |
| 404,809 | Great Britain | Jan. 25, 1934 |
| 21,665 | Austria | Oct. 10, 1905 |